(12) United States Patent
Rupanagunta et al.

(10) Patent No.: US 10,055,377 B2
(45) Date of Patent: Aug. 21, 2018

(54) USING A PROPRIETARY FRAMEWORK ON A STANDARDS-BASED EMBEDDED DEVICE

(71) Applicant: HGST Netherlands B.V., Amsterdam (NL)

(72) Inventors: Sriram Rupanagunta, Bangalore (IN); Nagaraj Kalmala, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 289 days.

(21) Appl. No.: 15/052,023

(22) Filed: Feb. 24, 2016

(65) Prior Publication Data

US 2017/0242820 A1 Aug. 24, 2017

(51) Int. Cl.
| | |
|---|---|
| *G06F 3/00* | (2006.01) |
| *G06F 13/00* | (2006.01) |
| *G06F 13/42* | (2006.01) |
| *G06F 13/28* | (2006.01) |
| *G06F 13/38* | (2006.01) |
| *G06F 13/40* | (2006.01) |

(52) U.S. Cl.
CPC .......... *G06F 13/4282* (2013.01); *G06F 13/28* (2013.01); *G06F 13/385* (2013.01); *G06F 13/4072* (2013.01)

(58) Field of Classification Search
None
See application file for complete search history.

(56) References Cited

U.S. PATENT DOCUMENTS

| | | | |
|---|---|---|---|
| 8,589,730 B2 | 11/2013 | Byom et al. | |
| 8,966,319 B2 | 2/2015 | Fai et al. | |
| 2013/0007348 A1 | 1/2013 | Fai et al. | |
| 2013/0198311 A1* | 8/2013 | Tamir | G06F 15/167 709/212 |
| 2013/0339714 A1 | 12/2013 | Hormuth et al. | |
| 2014/0173357 A1 | 6/2014 | Anderson et al. | |
| 2014/0344960 A1 | 11/2014 | Adams | |

FOREIGN PATENT DOCUMENTS

CN 103996416 8/2014

* cited by examiner

*Primary Examiner* — Farley Abad
*Assistant Examiner* — Richard B Franklin
(74) *Attorney, Agent, or Firm* — McDermott Will & Emery LLP

(57) ABSTRACT

A vendor extension command is used to transport a proprietary message to a device (e.g., a solid state drive), to instruct the device to access and return data stored on the device (e.g., data that can be used for debugging). More specifically, a device that is coupled to a host system by a host bus interface (e.g., a Peripheral Component Interconnect Express bus) receives a command in a vendor extension of a standard driver (e.g., a Non-Volatile Memory Express driver). In response to the command in the vendor extension, data (e.g., debugging data) stored in memory on the device is accessed. The data can then be sent over the host bus interface to the host system. Thus, for example, a proprietary debugging framework can be used with a standards-based device.

15 Claims, 5 Drawing Sheets

USING A PROPRIETARY FRAMEWORK ON A STANDARDS-BASED EMBEDDED DEVICE

BACKGROUND

Vendors produce and sell devices such as solid state devices or drives (SSDs) that are then connected to a host computer system such as a server. Such devices may also be known as embedded devices or embedded systems.

To promote use and facilitate development of SSDs, the Non-Volatile Memory Express (NVMe) standard was developed by a consortium of SSD vendors. NVMe-compliant devices support use of the NVMe protocol, and a standard (open source) NVMe software driver is executed by the host system. Before the NVMe standard was established, each vendor usually provided their own proprietary software driver that could be installed on the host system so that the host could communicate with their SSD. With the advent of the NVMe standard, vendors can build SSDs that work with the standard driver, precluding the need for a proprietary driver on the host system and thus making it easier for their SSDs to be installed in different hosts (plug and play). Standardizing the interface with the SSDs also makes it easier to design host systems, since they do not have to be able to accommodate different designs and behaviors.

Some vendors also provided a debugging framework that included proprietary software tools or utilities that could be used to collect information (e.g., crash dumps, logs, etc.) from the SSD in the event of a problem of some sort. The information was useful because it allowed those vendors to diagnose and correct the source of a problem. Vendors that spent time and money developing non-standard (proprietary) debugging frameworks before the NVMe standard was in place would like to be able to continue to use their framework even with standards-based devices. However, it is difficult and perhaps not possible to use a proprietary debugging framework with the standard driver. For example, a standards-based device does not have the same interfaces as a proprietary device, so tools and utilities previously used to collect information from a proprietary device may not work with a standards-based device.

SUMMARY

In an embodiment, a command included in a vendor extension to a standard protocol is used to transport a proprietary message to a device, to instruct the device to access and return data stored by the device (e.g., data that can be used for debugging). Embodiments according to the present invention thus permit, for example, the use of a proprietary debugging framework with a standards-based device.

More specifically, in an embodiment, a device receives, from a host system over a host bus interface, a command in a vendor extension of a standard driver for the device. In one such embodiment, the device is a solid state drive (SSD), the standard driver is a Non-Volatile Memory Express (NVMe) driver, and the host bus interface includes a Peripheral Component Interconnect Express (PCIe) bus.

In response to the command in the vendor extension, data (e.g., debugging data) stored in memory on the device is accessed. The memory on the device can include a ring buffer in dynamic random access memory (DRAM), and/or non-volatile flash memory. The data can then be sent over the host bus interface to the host system.

In an embodiment, the device includes a controller that can execute a first proprietary driver that logs the data into the memory on the device and that accesses and sends the data in response to the command in the vendor extension. In an embodiment, the controller executes a second proprietary driver in lieu of the first proprietary driver when the first proprietary driver is unavailable (e.g., it crashes). The first proprietary driver and the second proprietary driver can be placed in different domains of firmware so that the second proprietary driver remains functional even if the first proprietary driver crashes. The second proprietary driver is a lightweight driver relative to the first proprietary driver in that it performs fewer functions than the first proprietary driver. Specifically, in an embodiment, the second proprietary driver only accesses and sends the aforementioned data. The second proprietary driver operates when the first proprietary driver is unavailable. In an embodiment, the first proprietary driver periodically initiates a keep-alive signal, and the second proprietary driver accesses and sends the data when it does not receive the keep-alive signal.

In summary, embodiments according to the present invention permit the use of proprietary tools and utilities (e.g., a proprietary debugging framework) with a standards-based driver, without changing the driver and while remaining compliant with the protocol specified in the standard.

These and other objects and advantages of the various embodiments of the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Figure 1:
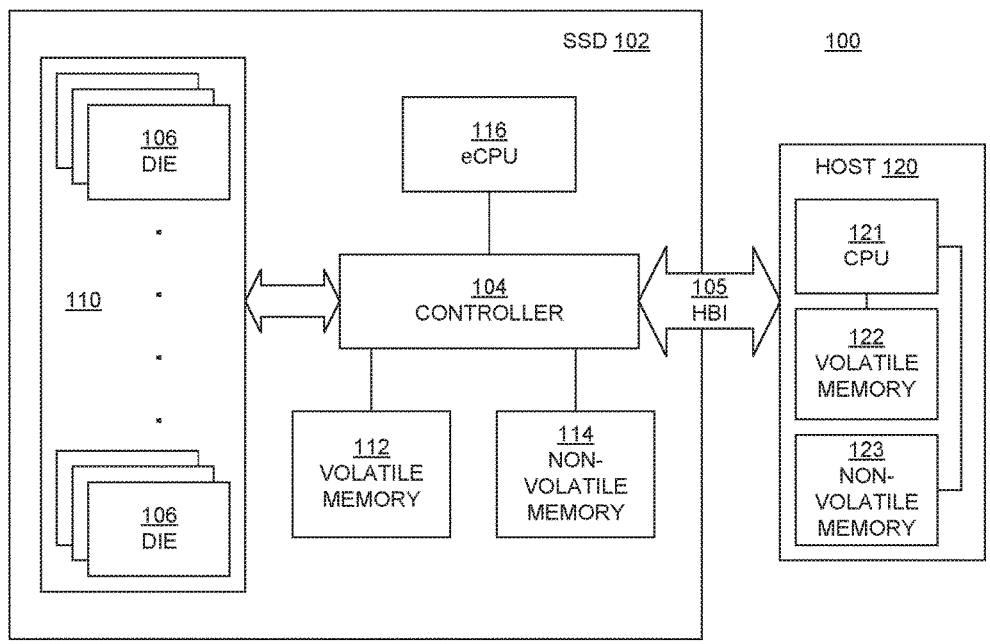
FIG. 1 a block diagram showing elements of a system upon which embodiments according to the present invention can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Further-more, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "accessing," "sending," "executing," "initiating," "logging," "storing," or the like, refer to actions and processes (e.g., flowchart 600 of FIG. 6) of an apparatus or computer system or similar electronic computing device or processor (e.g., the system 100 of FIG. 1). A computer system or similar electronic computing device manipulates and transforms data represented as physical (electronic) quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory (e.g., an SSD or NVMD) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 a block diagram showing elements of a computer system 100 upon which embodiments according to the present invention can be implemented. The system 100 may include elements other than those shown.

In the example of FIG. 1, the system 100 includes a central processing unit (CPU) 121, volatile memory 122, and non-volatile memory 123. The volatile memory 122 may be, for example, dynamic random access memory (DRAM). The CPU 121, volatile memory 122, and non-volatile memory 123 (along with other elements, not shown) constitute what may be referred to as a host system 120.

The system 100 is coupled to or incorporates a device that may be referred to as an embedded device or an embedded system. In the example embodiment of FIG. 1, the device is a solid state drive (SSD) 102, which may also be known as a non-volatile memory device (NVMD) or a flash memory device.

The host system 120 and the SSD 102 communicate via a host bus interface (HBI) 105. In an embodiment, the HBI 105 includes a Peripheral Component Interconnect Express (PCIe) bus. In an embodiment, the SSD 102 complies with the Non-Volatile Memory Express (NVMe) standard.

The SSD 102 includes a controller 104 that may be referred to as the master controller. The SSD 102 also includes a number of storage elements, specifically a chip array 110 that includes a number of dies or chips 106 that are used to store data. In an embodiment, the dies 106 include any number of non-volatile memory elements such as NAND flash elements, and as such the SSD 102 may be referred to as a NAND flash device. Alternatively, the dies may include NOR flash elements. There may be any number of dies 106. The SSD 102 may include elements other than those shown.

The controller 104 can be implemented as an application-specific integrated circuit (ASIC) or field-programmable gate array (FPGA) that is embedded in the SSD 102. In general, the controller 104 includes control circuitry that facilitates reading, writing, erasing, and other operations on the dies 106. In an embodiment, the controller 104 includes an embedded CPU (eCPU) 116 or is coupled to the eCPU 116 by a bus (e.g., a PCIe bus). The eCPU 116 executes firmware that processes commands from the host CPU 121. In particular, in an embodiment, the eCPU 116 supports the NVMe protocol.

In an embodiment, the controller 104 includes a flash translation layer (FTL) to translate logical block addresses from the host system 120 to physical addresses on the SSD 102, a write path, and a read path. The write path may include a physical layer (PHY) interface and a serializer/deserializer that converts data between the analog and digital domains (from analog to digital, and from digital to analog). The write path may also include a data compression block, an encryption block, and an error correction code (ECC) encoding block. The read path may include an ECC decoding block, a decryption block, and a decompression block. The controller 104 is coupled to the dies 106 via, for example, an Open NAND Interface (ONFI). A chip select signal is used by the controller 104 to locate, address, and/or activate a particular one of the dies 106.

The SSD 102 also includes volatile memory 112 and non-volatile memory 114. In an embodiment, the volatile memory 112 is a ring buffer in DRAM, and the non-volatile memory 114 is flash memory.

Figure 2:
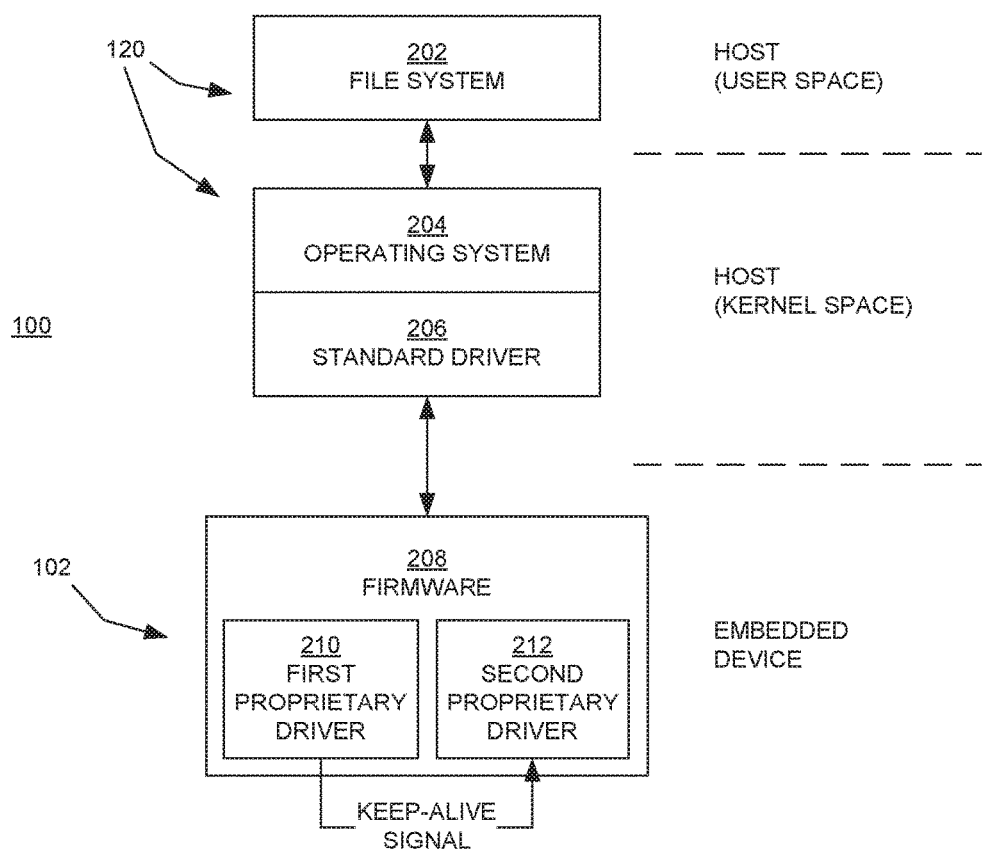
FIG. 2 is a block diagram showing computer-executable components stored on non-transitory computer-readable media in system in an embodiment according to the present invention.

FIG. 2 is a block diagram showing computer-executable components stored on non-transitory computer-readable media in the system 100 (FIG. 1) in an embodiment according to the present invention. Some of the computer-executable components in the FIG. 2 embodiment are implemented in non-transitory computer-readable media in the host system 120, and the remainder of the computer-executable components shown in FIG. 2 are implemented in non-transitory computer-readable media in the embedded device (e.g., the SSD 102).

In the FIG. 2 embodiment, a file system 202 is implemented in user space on the host system 120; alternatively, the file system is implemented in kernel space on the host system 120. In an embodiment, an operating system 204 and a standard (standards-based) driver 206 for the embedded device (e.g., the SSD 102) are implemented in kernel space on the host system 120. In an embodiment, the standard driver 206 is an NVMe driver.

In an embodiment, a first proprietary driver 210 is implemented in firmware 208 in the eCPU 116 on the SSD 102. A "standard driver" refers to a free or open source driver; otherwise, the driver is a "proprietary driver." In another embodiment, a second proprietary driver 212 is also implemented in firmware 208 in the eCPU 116 on the SSD 102. In the latter embodiment, the second proprietary driver 212 is executed by the eCPU 116 to perform functions (described below) when the first proprietary driver 210 is unavailable (e.g., it crashes). The first proprietary driver 210 and the second proprietary driver 212 can be placed in different domains of the firmware 208 so that the second proprietary driver remains functional even if the first proprietary driver crashes. In an embodiment, the first proprietary driver 210 periodically initiates a keep-alive signal, and the second proprietary driver 212 performs its functions when it does not receive the keep-alive signal.

With reference also to FIG. 1, the first proprietary driver 210 logs data (debugging information) into the volatile memory 112 on the SSD 102, and also classifies and logs critical events to the non-volatile memory 114 on the SSD for useful historical reference. In this manner, more recent information is recorded in the volatile memory 112, while the non-volatile memory 114 more permanently records information that may be more critical. A lockless design can be used to minimize interference with the data path in the SSD 102.

The first proprietary driver 210 of FIG. 2 can also perform other functions, such as data path management, wear leveling, and garbage collection. The second proprietary driver 212 is a lightweight driver relative to the first proprietary driver 210 in that it performs fewer functions than the first proprietary driver. The second proprietary driver 212 can operate when the first proprietary driver 210 is not available. Functions of each driver are described below in the context of how those drivers are used to implement a proprietary framework in a standards-based device.

Figure 3:
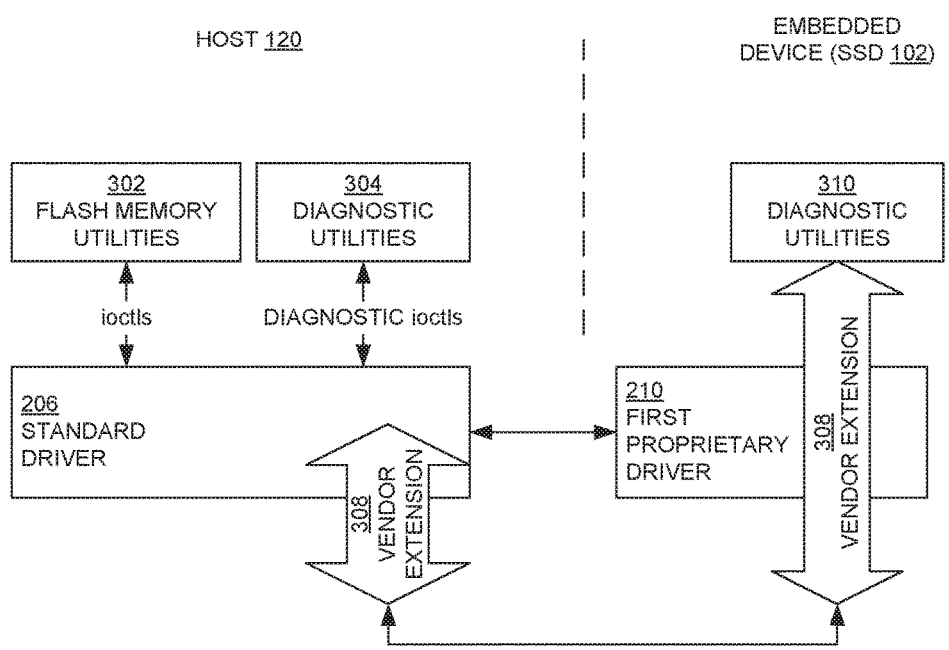
FIG. 3 is a block diagram showing computer-executable components implemented in a system in an embodiment according to the present invention.

FIG. 3 is a block diagram showing computer-executable components implemented in (executed by) the system 100 (FIG. 1) in an embodiment according to the present invention. In the FIG. 3 embodiment, the host system 120 stores and executes flash memory utilities 302 and proprietary diagnostic utilities 304, and the embedded device (e.g., the SSD 102) stores and executes proprietary diagnostic utilities 310.

Flash memory utilities 302 can be used for configuring and managing the SSD 102 and for writing and reading data to and from the SSD. Diagnostic utilities 304 are host-based and embedded operating system-based tools to control logging of the aforementioned debugging information, including the granularity of logging levels and events, and to query logs to collect the debugging information from the SSD 102. Diagnostic utilities 310 help orchestrate collection of the debugging information on the SSD 102. The debugging information received by the host system 120 from the SSD 102 can be stored in a file that is sent to the SSD vendor for diagnosis, for example. The utilities 302 and 304 communicate with the standard driver 206 via input/output control signals (ioctls; e.g., system calls).

With reference also to FIG. 1, the standard driver 206 and the first proprietary driver 210 communicate with each other in standard fashion over the HBI 105. As further described below, a vendor extension 308 to the standard protocol is used to transport a command over the HBI 105 to an embedded device (e.g., the SSD 102). In general, the vendor extension 308 packages a command from the host system 120, and the eCPU 116 runs logic (the first proprietary driver 210) to implement the command.

Figure 4:
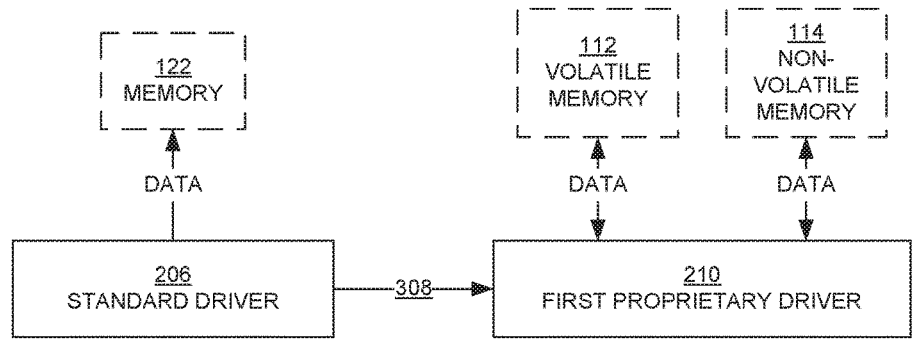
FIG. 4 is a block diagram showing the flow of information between a host system and an embedded device in an embodiment according to the present invention.

FIG. 4 is a block diagram showing the flow of information between the host system 120 and the embedded device (e.g., the SSD 102) in an embodiment according to the present invention. In this embodiment, a command is included in a vendor extension 308 to the standard protocol (e.g., the NVMe protocol) to transport a proprietary message to the SSD 102, in order to instruct the SSD to access and return data stored by the SSD (e.g., the data that can be used for debugging). More specifically, in an embodiment, the SSD 102 receives, from the host system 120 over the HBI 105, a command in the vendor extension 308. In response to the command in the vendor extension 308, data (e.g., debugging data) stored in the memory 112 and/or the memory 114 on the SSD 102 is accessed and sent to the host system 120. In an embodiment, the eCPU 116 (FIG. 1) executes the first proprietary driver 210, which accesses and sends the data in response to the command in the vendor extension 308.

Figure 5:
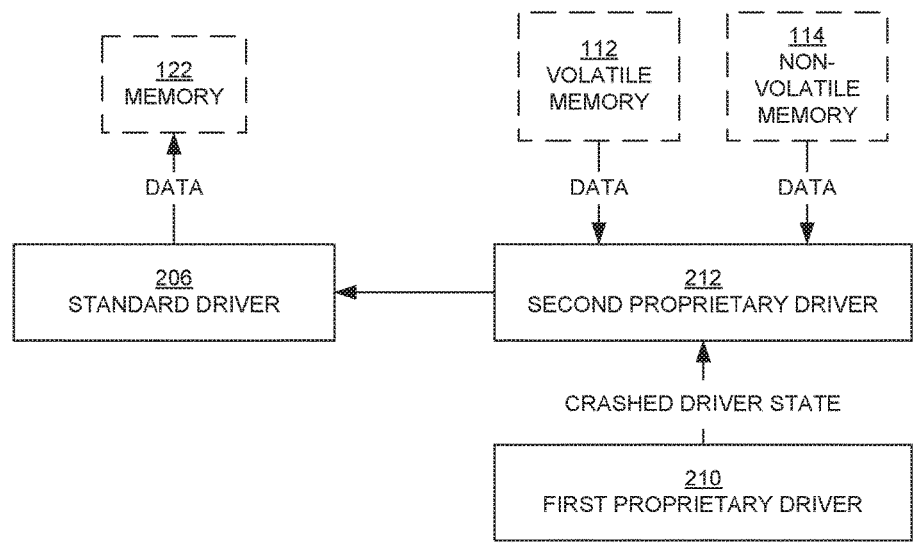
FIG. 5 is a block diagram showing the flow of information between a host system and an embedded device in another embodiment according to the present invention.

FIG. 5 is a block diagram showing the flow of information between the host system 120 and the embedded device (e.g., the SSD 102) in another embodiment according to the present invention. In this embodiment, the second proprietary driver 212 is executed by the eCPU 116 in lieu of the first proprietary driver 210 when the first proprietary driver is unavailable (e.g., it crashes). The second proprietary driver 212 can execute even though the first proprietary driver 210 has crashed. In an embodiment, the second proprietary driver 212 accesses and sends the data from the memories 112 and 114 to the host system 120 when it does not receive a keep-alive signal from the first proprietary driver 210 as mentioned above. The process of transitioning from the first proprietary driver 210 to the second proprietary driver 212 is seamless and transparent to the host system 120 and a user.

The state of the crashed first proprietary driver 210 can also be sent to the host system 120. That is, if the first proprietary driver crashes, then a crash dump is generated and can be sent to the host system 120 so that it can be analyzed. Thus, it is possible to debug the software running on the eCPU 116.

Figure 6:
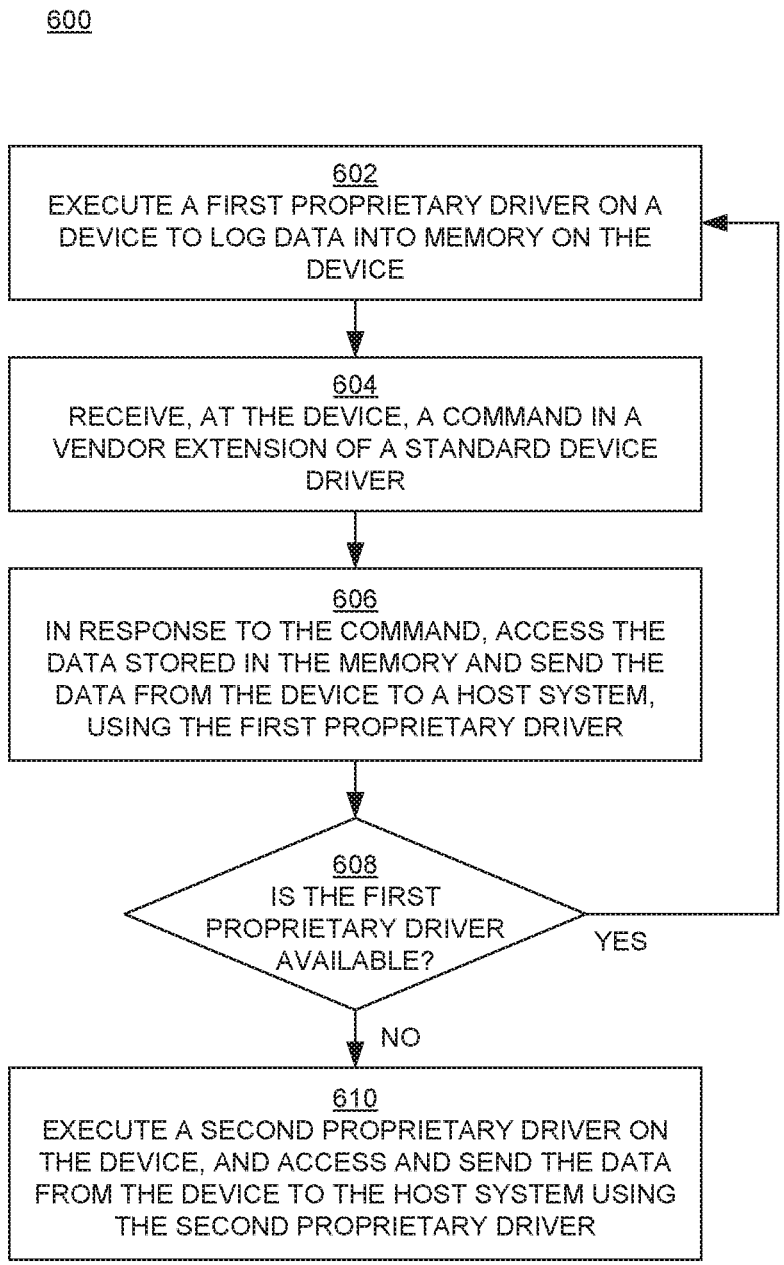
FIG. 6 is a flowchart of a method for using a proprietary framework on a standards-based embedded device in an embodiment according to the present invention.

FIG. 6 is a flowchart 600 of a method for using a proprietary framework on a standards-based embedded device in an embodiment according to the present invention. All or some of the operations represented by the blocks in the flowchart 600 can be implemented as computer-executable instructions residing on some form of non-transitory computer-readable storage medium and performed by a computer system.

In block 602, a first proprietary driver is executed on a device. The first proprietary driver logs data (e.g., debugging data) into memory on the device, and may also perform other functions as previously described herein. In an embodiment, the device is an SSD coupled to a host system over a host bus interface. In an embodiment, the host bus interface includes a PCIe bus.

In block 604, the device receives, from the host system over the host bus interface, a command in a vendor extension of a standard driver for the device. In an embodiment, the standard driver is an NVMe driver.

In block 606, in response to the command in the vendor extension, the first proprietary driver accesses the data (e.g., debugging data) stored in memory on the device and sends the data over the host bus interface to the host system.

In block 608, a determination is made with regard to whether or not the first proprietary driver is available. If the first proprietary driver is unavailable, then the flowchart 600 proceeds to block 610. If the first proprietary driver is available, then the flowchart 600 returns to block 602.

In an embodiment, the first proprietary driver periodically sends keep-alive signals. In such an embodiment, if the keep-alive signals are not received by a second proprietary driver, then the determination is that the first proprietary driver is unavailable (e.g., it crashed).

In block 610, the second proprietary driver performs functions in place of the first proprietary driver when the first proprietary driver is unavailable. Specifically, in an embodiment, the second proprietary driver accesses the data (e.g., debugging data) stored in memory on the device and sends the data over the host bus interface to the host system in lieu of the first proprietary driver when the first proprietary driver is unavailable.

In summary, embodiments according to the present invention permit the use of proprietary tools and utilities (e.g., a proprietary debugging framework) with a standards-based driver, without changing the driver and while remaining compliant with the protocol specified in the standard. Proprietary commands can be mapped to a standards-based device. Vendors can use their previously developed, proprietary tools to access data on a standards-based embedded device; it is not necessary to develop new tools. The data can be accessed from a host system, without the need for a serial interface and additional cables or other types of hardware connectors.

While the foregoing disclosure describes the present invention using an SSD as an example of an embedded device, NVMe as an example of a standard, and collecting debugging information as an example of a command that is included in a vendor extension, the present invention is not so limited, and may be implemented using different types of embedded devices (with their associated driver(s)) and standards and for different purposes.

Also, while the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the following claims.

What is claimed is:

1. A method, comprising:
receiving at a device, from a host system and over a host bus interface, a command in a vendor extension of a standard driver for the device;
in response to the command, executing a first proprietary driver, wherein the first proprietary driver, when executing, performs operations comprising:
logging data into memory on the device, and
accessing the data and sending the data to the host system in response to the command; and
executing a second proprietary driver when the first proprietary driver is unavailable, wherein the second proprietary driver, when executing, performs operations in lieu of the first proprietary driver, the operations comprising:
accessing the data, and
sending the data to the host system.

2. The method of claim 1, wherein the first proprietary driver and the second proprietary driver are in different domains of firmware.

3. The method of claim 1, further comprising executing the second proprietary driver in response to the second proprietary driver not receiving a keep-alive signal from the first proprietary driver.

4. The method of claim 1, wherein the device is a solid state drive (SSD) comprising flash memory, the standard driver is a Non-Volatile Memory Express (NVMe) driver, and the host bus interface comprises a Peripheral Component Interconnect Express (PCIe) bus.

5. The method of claim 1, wherein the data comprises debugging data and the memory is selected from the group consisting of: a ring buffer in dynamic random access memory (DRAM); and non-volatile flash memory.

6. A system, comprising:
a central processing unit (CPU);
a first memory coupled to the CPU;
a host bus interface coupled to the CPU; and
a device coupled to the host bus interface, the device comprising a controller and second memory that stores debugging data;
wherein the CPU is configured to execute a standard driver for the device to send a command over the host bus interface to the controller using a vendor extension of the standard driver, and wherein the controller is configured to execute a first proprietary driver that accesses and sends the debugging data over the host bus interface to the first memory in response to the command, and the first proprietary driver also logs the debugging data into the second memory, and the controller is further configured to execute a second proprietary driver, wherein the second proprietary driver accesses and sends the debugging data in lieu of the first proprietary driver when the first proprietary driver is unavailable.

7. The system of claim 6, wherein the first proprietary driver and the second proprietary driver are in different domains of firmware.

8. The system of claim 6, wherein the first proprietary driver periodically initiates a keep-alive signal, wherein the second proprietary driver accesses and sends the debugging data when it does not receive the keep-alive signal.

9. The system of claim 6, wherein the device is a solid state drive (SSD) comprising flash memory, the standard driver is a Non-Volatile Memory Express (NVMe) driver, and the host bus interface comprises a Peripheral Component Interconnect Express (PCIe) bus.

10. The system of claim 6, wherein the second memory is selected from the group consisting of: a ring buffer in dynamic random access memory (DRAM); and non-volatile flash memory.

11. Non-transitory computer-readable media having stored thereon computer-executable components that when executed perform operations comprising operations for debugging a device, the components comprising:
an operating system for a host system coupled to the device via a host bus interface;
a standard driver for the device, the standard driver executed by the operating system and configured to send a command over the host bus interface to the device using a vendor extension of the standard driver;
a first proprietary driver for the device, the first proprietary driver operable for logging debugging data into a memory on the device when executed by the device, the first proprietary driver further operable for accessing and sending the debugging data over the host bus interface to the host system in response to the command when executed by the device; and
a second proprietary driver for the device executed by the device, wherein the second proprietary driver accesses and sends the debugging data in lieu of the first proprietary driver when the first proprietary driver is unavailable.

12. The non-transitory computer-readable media of claim 11, wherein the first proprietary driver and the second proprietary driver are in different domains of firmware.

13. The non-transitory computer-readable media of claim 11, wherein the first proprietary driver periodically initiates a keep-alive signal, wherein the second proprietary driver accesses and sends the debugging data when it does not receive the keep-alive signal.

14. The non-transitory computer-readable media of claim 11, wherein the device is a solid state drive (SSD) comprising flash memory, the standard driver is a Non-Volatile Memory Express (NVMe) driver, and the host bus interface comprises a Peripheral Component Interconnect Express (PCIe) bus.

15. The non-transitory computer-readable media of claim 11, wherein the memory is selected from the group consisting of: a ring buffer in dynamic random access memory (DRAM); and non-volatile flash memory.

* * * * *